United States Patent
Izumi et al.

(10) Patent No.: US 11,293,369 B2
(45) Date of Patent: Apr. 5, 2022

(54) ENGINE CONTROL DEVICE FOR PORT FUEL INJECTION DURING PERIOD BETWEEN START OF COMPRESSION STROKE AND CLOSE OF INTAKE VALVE

(71) Applicant: KEIHIN CORPORATION, Tokyo (JP)

(72) Inventors: Hiroki Izumi, Shioya-gun (JP); Kenji Takahashi, Shioya-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/364,686

(22) Filed: Mar. 26, 2019

(65) Prior Publication Data

US 2019/0301350 A1  Oct. 3, 2019

(30) Foreign Application Priority Data

Mar. 28, 2018  (JP) .............................. JP2018-062572

(51) Int. Cl.
| | |
|---|---|
| *F02D 41/30* | (2006.01) |
| *F02D 41/34* | (2006.01) |
| *F02D 41/00* | (2006.01) |
| *F02D 13/02* | (2006.01) |
| *F02D 41/40* | (2006.01) |
| *F02D 41/38* | (2006.01) |
| *F02D 21/08* | (2006.01) |

(52) U.S. Cl.
CPC ......... *F02D 41/30* (2013.01); *F02D 13/0215* (2013.01); *F02D 13/0261* (2013.01);
(Continued)

(58) Field of Classification Search
CPC ............. F02D 13/0215; F02D 13/0261; F02D 13/0265; F02D 41/006; F02D 41/0062;
(Continued)

(56) References Cited

U.S. PATENT DOCUMENTS

| | | | |
|---|---|---|---|
| 6,267,097 B1 * | 7/2001 | Urushihara | ............... F01L 1/34 |
| | | | 123/299 |
| 2001/0015192 A1 * | 8/2001 | Urushihara | ........... F02D 41/402 |
| | | | 123/299 |

(Continued)

FOREIGN PATENT DOCUMENTS

| | | |
|---|---|---|
| CN | 102664034 A | 9/2012 |
| JP | 2004360524 A | 12/2004 |

(Continued)

OTHER PUBLICATIONS

CNIPA The Second Office Action for corresponding CN Patent Application No. 201880053040.9; dated Aug. 16, 2021.
(Continued)

*Primary Examiner* — Laert Dounis
(74) *Attorney, Agent, or Firm* — Cantor Colburn LLP

(57) ABSTRACT

Provided is an engine control device which controls at least an intake valve, an exhaust valve, and a fuel injection valve injecting a fuel into an intake pipe such that internal EGR is realized, in which timing of opening and closing of the intake valve is set to be later in comparison with a reference operation state which is a first operation state and timing of closing of the exhaust valve is set to be earlier in comparison with the reference operation state, and the fuel injection valve is caused to inject the fuel in a period which is: after a piston starts to rise which had been passed through a bottom dead center for the first time after an exhaust stroke is finished, which is followed by closing of the intake valve; and before the intake valve is opened.

2 Claims, 3 Drawing Sheets

(52) U.S. Cl.
CPC ....... *F02D 41/006* (2013.01); *F02D 41/3094* (2013.01); *F02D 41/345* (2013.01); *F02D 41/402* (2013.01); *F02D 2021/083* (2013.01); *F02D 2041/001* (2013.01); *F02D 2041/389* (2013.01); *Y02T 10/12* (2013.01); *Y02T 10/40* (2013.01)

(58) Field of Classification Search
CPC .... F02D 41/3094; F02D 41/34; F02D 41/345; F02D 41/365; F02D 41/40–408
See application file for complete search history.

(56) References Cited

U.S. PATENT DOCUMENTS

| | | | |
|---|---|---|---|
| 2004/0244766 A1 | 12/2004 | Fujieda et al. | |
| 2006/0219215 A1* | 10/2006 | Brachert | F02B 23/08 123/299 |
| 2013/0110377 A1* | 5/2013 | Sukegawa | F02M 26/01 701/103 |
| 2016/0084150 A1* | 3/2016 | Kawabe | F02D 41/3094 123/294 |
| 2018/0347502 A1* | 12/2018 | Toya | F02D 13/0253 |

FOREIGN PATENT DOCUMENTS

| | | |
|---|---|---|
| JP | 2007224740 A | 9/2007 |
| JP | 2012057527 A | 3/2012 |
| JP | 2012107588 A | 6/2012 |

OTHER PUBLICATIONS

Qin Jian et al., "Android Programming Paradigm", Beijing Aeronautics and Astronautics University Press, Mar. 2013; pp. 423-424.
JPO Notice of Reasons for Refusal for corresponding JP Application No. 2018-062572; dated Nov. 30, 2021.

* cited by examiner

ENGINE CONTROL DEVICE FOR PORT FUEL INJECTION DURING PERIOD BETWEEN START OF COMPRESSION STROKE AND CLOSE OF INTAKE VALVE

CROSS REFERENCE TO RELATED APPLICATION

The present application claims priority under 35 U.S.C. § 119 to Japanese Application No. 2018-062572, filed Mar. 28, 2018, the entire content of which is incorporated herein by reference.

BACKGROUND OF THE INVENTION

Field of the Invention

The present invention relates to an engine control device.

Description of Related Art

Japanese Unexamined Patent Application, First Publication No. 2012-057527 discloses a control device for an internal combustion engine, which is provided with a plurality of intake ports provided with respect to one cylinder and exhaust gas supplying means for recirculating an exhaust gas into any intake port other than at least one of the plurality of intake ports for each exhaust stroke in the internal combustion engine such that the recirculated exhaust gas is supplied into the cylinder during an intake stroke after an exhaust stroke that is at least one cycle apart from the exhaust stroke.

The control device uses an internal EGR technique and an object thereof is to achieve both of an increase in temperature of an intake valve and suppression of knocking.

SUMMARY OF THE INVENTION

Meanwhile, in the case of the above-described control device, although the increase in temperature of the intake valve can be realized, there is still a problem in view of measures for heat damage to a fuel injection valve since the fuel injection valve disposed in the intake port is exposed to a high-temperature exhaust gas.

The present invention has been made in consideration of the above-described circumstances and an object thereof is to improve fuel vaporization promotion before ignition in comparison with the related art while taking measures for heat damage to a fuel injection valve.

In order to achieve the above-described object, the present invention adopts the following aspects.

(1) According to an aspect of the present invention, there is provided an engine control device which controls at least an intake valve, an exhaust valve, and a fuel injection valve injecting a fuel into an intake pipe, based on a crank angle of an engine provided with the fuel injection valve, such that internal EGR is realized, wherein timing of opening and closing of the intake valve is set to be later in comparison with a reference operation state which is a first operation state and timing of closing of the exhaust valve is set to be earlier in comparison with the reference operation state, and wherein the fuel injection valve is caused to inject the fuel in a period which is: after a piston starts to rise which had been passed through a bottom dead center for the first time after an exhaust stroke is finished, which is followed by closing of the intake valve; and before the intake valve is opened.

(2) In the engine control device according to (1), the fuel injection valve may be caused to inject a fuel at least once during the period between when the piston starts to rise after passing through the bottom dead center for the first time after the exhaust stroke is finished and when the intake valve is closed.

(3) In the engine control device according to (1), the engine may be provided with a second fuel injection valve that directly injects a fuel into the cylinder and the second fuel injection valve may be caused to inject the fuel during a period between when the intake valve is closed after the piston passes through the bottom dead center for the first time after the exhaust stroke is finished and when the piston reaches a top dead center.

(4) In the engine control device according to (2), the engine may be provided with a second fuel injection valve that directly injects a fuel into the cylinder and the second fuel injection valve may be caused to inject the fuel during a period between when the intake valve is closed after the piston passes through the bottom dead center for the first time after the exhaust stroke is finished and when the piston reaches a top dead center.

According to the aspects, it is possible to improve fuel vaporization promotion before ignition in comparison with the related art while taking measures for heat damage to a fuel injection valve.

DETAILED DESCRIPTION OF THE INVENTION

Hereinafter, an embodiment of the present invention will be described with reference to drawings.

Figure 1:
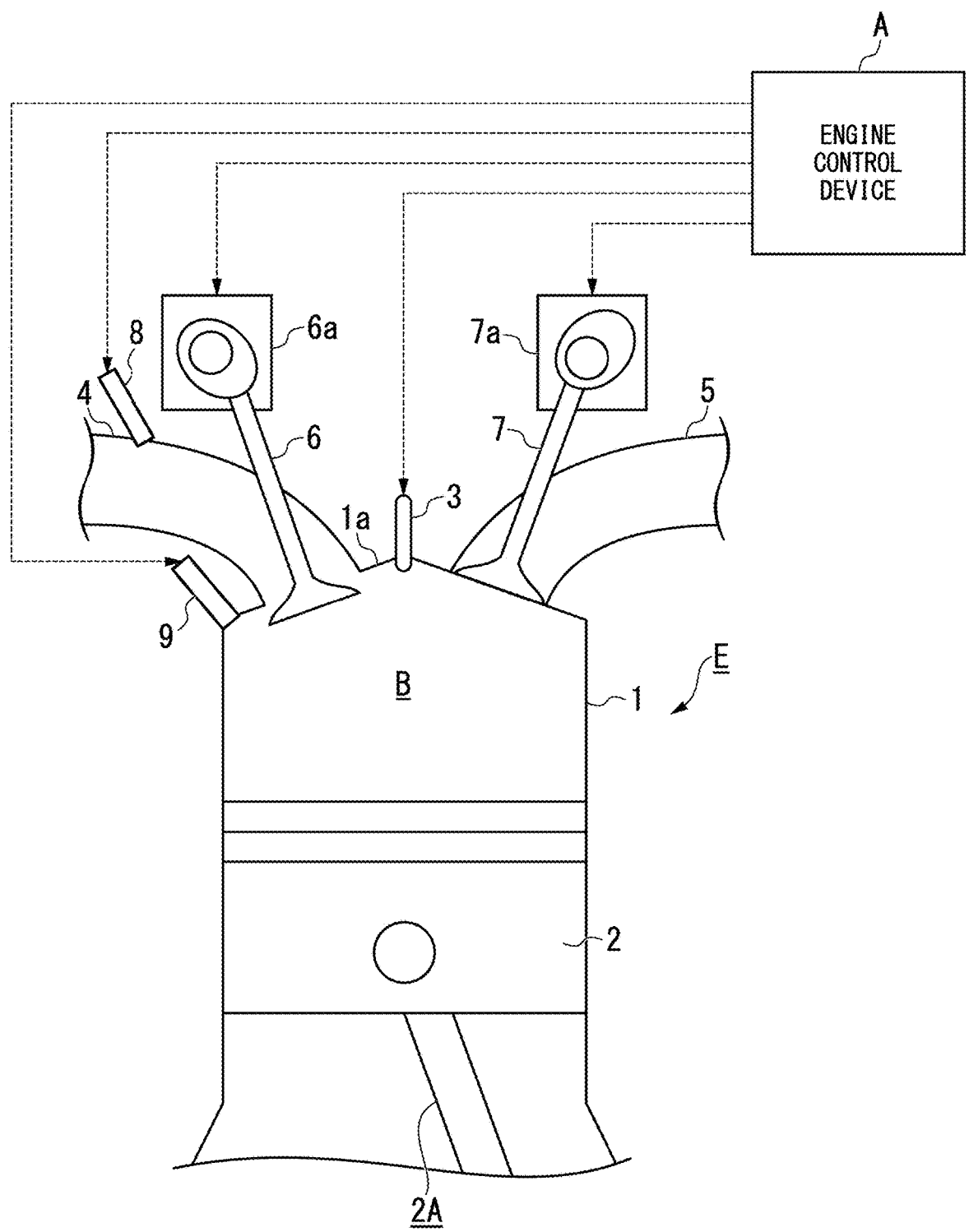
FIG. 1 is a schematic view illustrating an engine control device A according to an embodiment of the present invention and a configuration of a main part of an engine E which is a target to be controlled.

An engine control device A according to the present embodiment controls an engine E illustrated in FIG. 1. First, regarding the engine E, the engine E is a four-stroke gasoline engine and is provided with a cylinder 1, a piston 2, an ignition plug 3, an intake pipe 4, an exhaust pipe 5, an intake valve 6, an exhaust valve 7, a main fuel injection valve 8, and an auxiliary fuel injection valve 9.

The cylinder 1 is a metal component provided with a cylindrical internal space and accommodates the piston 2 such that the piston 2 can vertically move. An upper side of the cylinder 1 in FIG. 1 is a cylinder head 1a, and the cylinder head 1a is provided with the ignition plug 3, the intake pipe 4, the exhaust pipe 5, the intake valve 6, and the exhaust valve 7. The piston 2 is slidably accommodated in the internal space and is a cylindrical component that reciprocates within the internal space in an axial direction of a cylindrical shape. A lower side of the piston 2 in FIG. 1 is connected to a crank shaft (not shown) via a connecting rod 2A. In the internal space, a space between the cylinder head 1a and the piston 2 is a combustion chamber B in which fuel is combusted.

The cylinder head 1a is provided with the ignition plug 3 such that a tip end of the ignition plug 3 is exposed to the combustion chamber B and the ignition plug 3 ignites fuel in the combustion chamber B by discharging. The discharge (ignition) performed by the ignition plug 3 is controlled by the engine control device A. The intake pipe 4 is a pipe provided for the cylinder head 1a. One end of the intake pipe 4 opens into the combustion chamber B and the other end of the intake pipe 4 communicates with the atmosphere. Through the intake pipe 4, fuel injected from the main fuel injection valve 8 and air (air for combustion) taken in from the atmosphere are supplied to the combustion chamber B via an intake port.

As with the intake pipe 4, the exhaust pipe 5 is a pipe provided for the cylinder head 1a. One end of the exhaust pipe 5 opens into the combustion chamber B and the other end of the exhaust pipe 5 communicates with the atmosphere. The exhaust pipe 5 discharges a combustion gas (exhaust gas) generated in the combustion chamber B to the atmosphere via an exhaust port. Note that, a portion of the combustion chamber B to which one end of the intake pipe 4 is connected is the intake port and a portion of the combustion chamber B to which one end of the exhaust pipe 5 is connected is the exhaust port.

Although not shown in FIG. 1, a throttle valve or the like that adjusts the flow rate of air for combustion is provided in the middle of the intake pipe 4. An exhaust gas processing device or the like for purifying a combustion gas (exhaust gas) is provided in the middle of the exhaust pipe 5.

The intake valve 6 is a mechanical on-off valve that opens and closes the one end (tip end) of the intake pipe 4. The exhaust valve 7 is a mechanical on-off valve that opens and closes the one end (tip end) of the exhaust pipe 5. The intake valve 6 and the exhaust valve 7 are driven by valve operating mechanisms including a camshaft (not shown) connected to the crankshaft and are opened and closed in accordance with rotation of the camshaft, that is, rotation of the crankshaft. The valve operating mechanisms are mechanisms capable of changing the timing of opening of the valves with respect to the rotation of the crankshaft and are an intake valve variable valve timing mechanism 6a for the intake valve 6 and an exhaust valve variable valve timing mechanism 7a for the exhaust valve 7.

The main fuel injection valve 8 is an electromagnetic valve (needle valve) provided in the middle of the intake pipe 4 and injects a predetermined amount of gasoline (fuel) into the intake pipe 4. An operation of opening and closing the main fuel injection valve 8 is controlled by the engine control device A. In addition, the auxiliary fuel injection valve 9 is an electromagnetic valve (needle valve) provided in the cylinder head 1a and injects a predetermined amount of gasoline (fuel) into the combustion chamber B. An operation of opening and closing the auxiliary fuel injection valve 9 is controlled by the engine control device A. The auxiliary fuel injection valve 9 is an example of a second fuel injection valve in the present invention.

Figure 2:
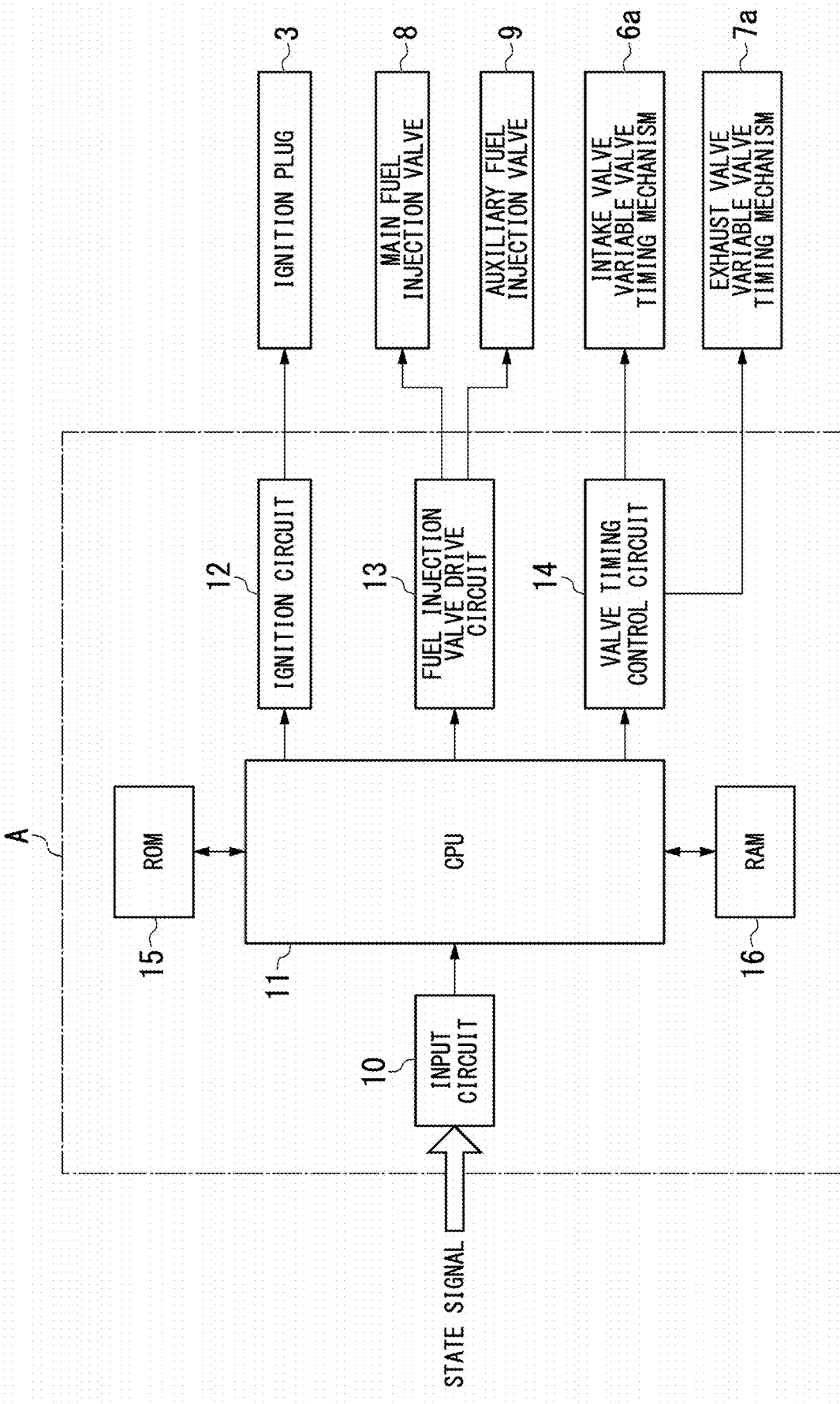
FIG. 2 is a block diagram illustrating a functional configuration of the engine control device A.

Next, a functional configuration of the engine control device A will be described with reference to FIG. 2. As illustrated in FIG. 2, the engine control device A is provided with an input circuit 10, a CPU 11, an ignition circuit 12, a fuel injection valve drive circuit 13, a valve timing control circuit 14, a ROM 15, and a RAM 16.

The input circuit 10 is an interface circuit that converts various state signals indicating the state of the engine E into signals that can be handled by the CPU 11. The state signal is a sensor signal of various sensors (not shown) provided in each part of the engine E and includes, for example, a crank pulse indicating the state of rotation of the engine E. The input circuit 10 outputs the converted state signal to the CPU 11.

The CPU 11 is an arithmetic device that controls the ignition circuit 12 and the fuel injection valve drive circuit 13 based on an engine control program stored in the ROM 15 and the converted state signal input from the input circuit 10. That is, the CPU 11 generates an ignition control signal based on the engine control program and the converted state signal and outputs the ignition control signal to the ignition circuit 12. In addition, the CPU 11 generates a fuel injection valve control signal and outputs the fuel injection valve control signal to the fuel injection valve drive circuit 13. Furthermore, the CPU 11 generates a valve control signal and outputs the valve control signal to the valve timing control circuit 14.

The ignition circuit 12 drives the ignition plug 3 based on the ignition control signal input from the CPU 11. That is, the ignition circuit 12 generates a plug drive signal synchronized with the ignition control signal and outputs the plug drive signal to the ignition plug 3. The fuel injection valve drive circuit 13 generates an injection valve drive signal based on the fuel injection valve control signal input from the CPU 11 and outputs the injection valve drive signal to the main fuel injection valve 8 and the auxiliary fuel injection valve 9. The valve timing control circuit 14 generates a valve timing control signal based on the valve control signal input from the CPU 11 and outputs the valve timing control signal to the intake valve variable valve timing mechanism 6a and the exhaust valve variable valve timing mechanism 7a.

The ROM 15 is a non-volatile memory that stores the engine control program and various control data necessary for executing the engine control program. The ROM 15 outputs the engine control program and the control data to the CPU 11 in response to a reading request input from the CPU 11. The RAM 16 is a volatile working memory that temporarily stores various data when the CPU 11 executes the engine control program.

Next, the operation of the engine control device A and the engine E according to the present embodiment will be described in detail with reference to FIG. 3 in addition to FIG. 1 and FIG. 2.

First, the engine E is operated with a combination of an intake stroke, a compression stroke, a combustion stroke, and an exhaust stroke as one cycle. The intake stroke is a stroke in which a mixture of fuel and air for combustion is taken into the combustion chamber B through the intake pipe 4 with the piston 2 lowered. In the intake stroke, the intake valve 6 opens the intake port and the exhaust valve 7 closes the exhaust port. The compression stroke is a stroke in which the air-fuel mixture which is taken into the combustion chamber B during the intake stroke is compressed with the piston 2 raised. In this compression stroke, the intake valve 6 closes the intake port and the exhaust valve 7 closes the exhaust port.

The combustion stroke is a stroke in which the air-fuel mixture compressed during the compression stroke is ignited by the ignition plug 3 under the control of the engine control device A. In this combustion stroke, the intake valve 6 closes the intake port and the exhaust valve 7 closes the exhaust port. When the air-fuel mixture is ignited in the combustion stroke, the piston 2 is pressed downward by the combustion gas. The exhaust stroke is a stroke in which the combustion gas generated during the combustion stroke is discharged to the outside of the combustion chamber B through the exhaust port with the piston 2 raised. In this exhaust stroke, the intake valve 6 closes the intake port and the exhaust valve 7 opens the exhaust port.

Here, when there is switch from the exhaust stroke to the intake stroke in the next cycle, a valve overlap period is provided at the end of the exhaust stroke. The valve overlap period is a period in which both of the intake valve 6 and the exhaust valve 7 open at a crank angle of approximately 360° as illustrated in FIG. 3. That is, in the valve overlap period, both of the intake port and the exhaust port open at the same time.

Figure 3:
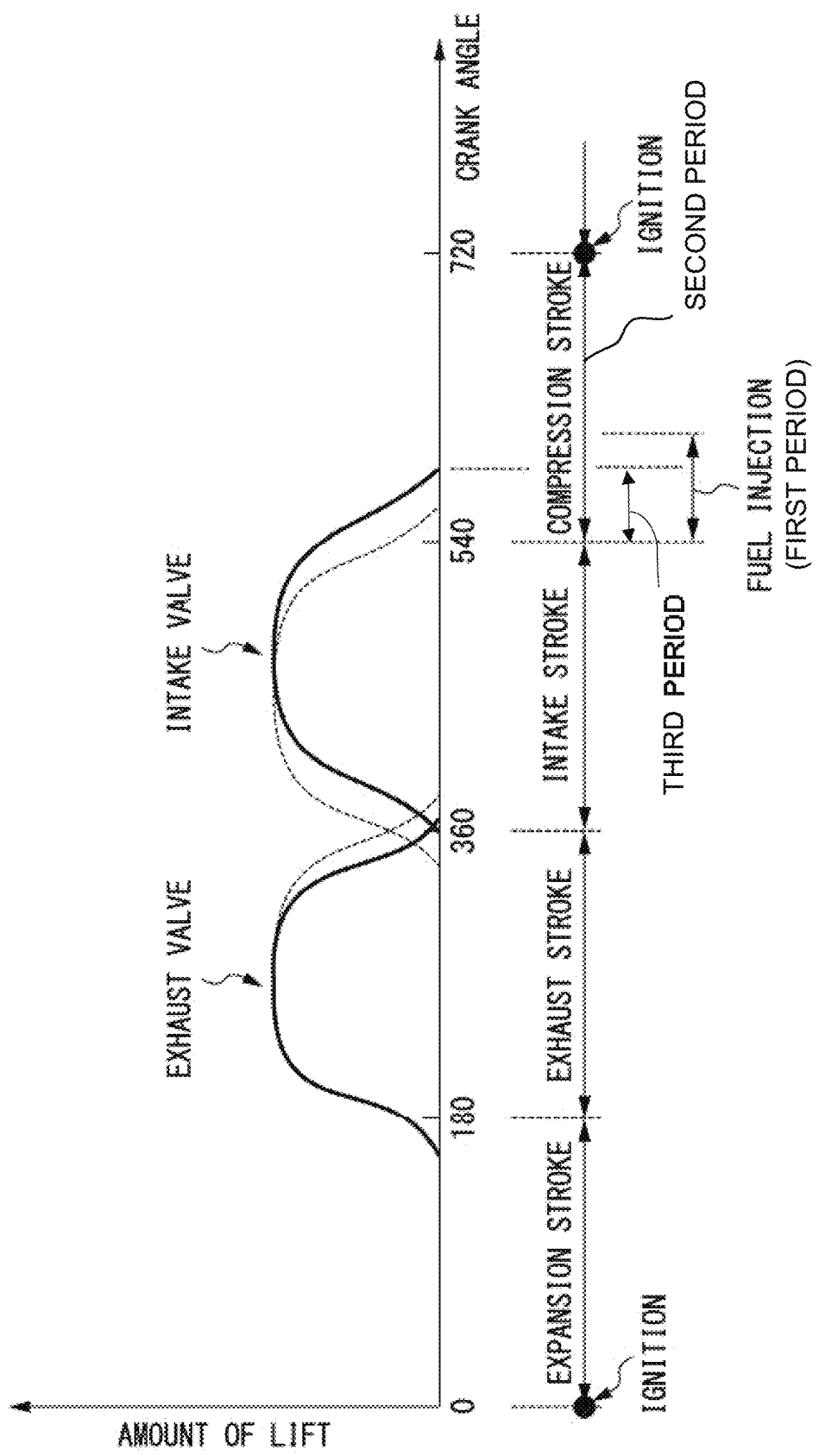
FIG. 3 is a timing chart illustrating an operation of the engine control device A.

In FIG. 3, broken lines show the amounts of lift of valve bodies (that is, opening and closing operations) of the intake valve 6 and the exhaust valve 7 in a reference operation state, which is a first operation state. The timing of opening and closing of the intake valve 6 and the timing of closing of the exhaust valve 7 in the reference operation state are set such that a possibility of internal exhaust gas recirculation (EGR) is minimized and a possibility of a gas flowing backward from the combustion chamber B into the intake pipe 4 is minimized. On the other hand, solid lines show the amounts of lift of valve bodies (that is, opening and closing operations) of the intake valve 6 and the exhaust valve 7 in the present embodiment. As illustrated in FIG. 3, according to the present embodiment, although there is still the valve overlap period in which both of the intake valve 6 and the exhaust valve 7 are open, the length of the valve overlap period is set to be significantly shorter than that in the related art.

That is, the engine control device A according to the present embodiment sets the timing of closing of the exhaust valve 7 to be earlier in comparison with an operation state in a stoichiometric region and sets the timing of opening and closing of the intake valve 6 to be later in comparison with an operation state in the stoichiometric region. In addition, as illustrated in FIG. 3, the engine control device A causes fuel to be injected to the intake pipe 4 from the main fuel injection valve 8 in a period which is: after the piston 2 had been passed through the bottom dead center, which is followed by closing of the intake valve 6; and before the intake valve 6 is opened.

According to the present embodiment, since the exhaust valve 7 is closed early, a high-temperature combustion gas remaining in the combustion chamber B is mixed with a low-temperature air-fuel mixture, which flows into the combustion chamber B during the intake stroke, and so-called internal EGR is performed. In addition, according to the present embodiment, since the intake valve 6 is closed late, a mixture of the gases of which the temperature is appropriate flows backward into the intake pipe 4. Therefore, the main fuel injection valve 8 disposed in the intake pipe 4 is not exposed to an excessively high temperature and the temperature in the intake pipe 4 can be set to a temperature most suitable for promotion of fuel vaporization. Furthermore, according to the present embodiment, it is possible to provide a long period for fuel vaporization promotion before the start of the intake stroke. Therefore, according to the present embodiment, it is possible to improve fuel vaporization promotion before ignition in comparison with the related art with the main fuel injection valve 8 not being exposed to an excessively high temperature.

In addition, the engine control device A according to the present embodiment causes the main fuel injection valve 8 to inject gasoline (fuel) at least once during a period between when the piston 2 starts to rise after passing through the bottom dead center for the first time after the exhaust stroke is finished and when the intake valve 6 is closed.

According to the present embodiment, since the fuel from the main fuel injection valve 8 is blown to a gas that flows backward from the inside of the cylinder 1 to the inside of the intake pipe 4 and is blown to the main fuel injection valve 8, the momentum of a gas directly reaching the main fuel injection valve 8 is weakened and the temperature of the gas is lowered due to vaporization of gasoline (fuel). Therefore, the influence of heat on the main fuel injection valve 8 can be further reduced.

Furthermore, in the present embodiment, the auxiliary fuel injection valve 9 that directly injects fuel into the cylinder 1 is provided and the engine control device A causes the auxiliary fuel injection valve 9 to inject gasoline (fuel) during a period between when the intake valve 6 is closed after the piston 2 passes through the bottom dead center for the first time after the exhaust stroke is finished and when the piston 2 reaches the top dead center.

In a state where the internal EGR is performed, a mixture of an air-fuel mixture introduced into the cylinder and a portion of combustion gas that is not discharged during the exhaust stroke is ignited after being compressed in the compression stroke, the combustion gas being generated due to the combustion. In order for the gas to be normally ignited and combusted, it is necessary that a necessary amount of fuel corresponding to the air for combustion contained in the introduced air-fuel mixture is mixed with the gas. In the present embodiment, at least a portion of the necessary amount of fuel is supplied by causing the main fuel injection valve 8 to inject fuel into the intake pipe 4 in a period which is: after the piston 2 had been passed through the bottom dead center, which is followed by closing of the intake valve 6; and before the intake valve 6 is opened.

The fuel injected from the main fuel injection valve 8 is introduced into the combustion chamber B after vaporization thereof is promoted in the intake pipe 4. However, in a state where the inside of the intake pipe 4 has been cooled down such as a state immediately after the engine E is started or the like, a gas flowing backward into the intake pipe 4 cannot sufficiently increase the temperature in the intake pipe 4. In this case, there is a possibility that the fuel injected from the main fuel injection valve 8 is not sufficiently vaporized. Therefore, the necessary amount of fuel cannot be supplied since the amount of fuel is limited that can be injected from the main fuel injection valve 8 to the intake pipe 4 in a period which is: after the piston 2 had been passed through the bottom dead center, which is followed by closing of the intake valve 6; and before the intake valve 6 is opened.

For example, it is conceivable to cause the main fuel injection valve 8 to inject fuel in the middle of the intake stroke in order for the necessary amount of fuel to be supplied into the cylinder. However, in this case, since a gas is cooled due to vaporization of fuel introduced into the combustion chamber B, a gas flowing backward to the intake pipe 4 is also cooled, which is not suitable for warming the inside of the intake pipe 4.

In this point, according to the present embodiment, the temperature of a gas flowing backward into the intake pipe 4 can be prevented from being lowered to a temperature lower than a temperature necessary for warming the inside of the intake pipe 4 since the auxiliary fuel injection valve 9 injects fuel into the combustion chamber B such that the necessary amount of fuel is supplied after the gas flows backward into the intake pipe 4. Furthermore, according to the present embodiment, since the fuel injected from the auxiliary fuel injection valve is injected to the piston, which is generally difficult to cool and of which the temperature is likely to be high, vaporization of the necessary amount of fuel is promoted in a preferable manner.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

A engine control device
E engine
1 cylinder
1a cylinder head
2 piston
3 ignition plug
4 intake pipe
5 exhaust pipe
6 intake valve
6a intake valve variable valve timing mechanism
7 exhaust valve
7a exhaust valve variable valve timing mechanism
8 main fuel injection valve
9 auxiliary fuel injection valve (second fuel injection valve)
10 input circuit
11 CPU
12 ignition circuit
13 fuel injection valve drive circuit
14 valve timing control circuit
15 ROM
16 RAM

What is claimed is:

1. An engine control device which controls at least an intake valve, an exhaust valve, and a fuel injection valve injecting a fuel into an intake pipe, based on a crank angle of an engine provided with the fuel injection valve, such that internal EGR is realized, wherein timing of opening and closing of the intake valve is set to be later in comparison with a reference operation state which is a first operation state and timing of closing of the exhaust valve is set to be earlier in comparison with the reference operation state, wherein the fuel injection valve is caused to inject a fuel in a first period, the first period being only within a second period between when the piston starts to rise after passing through a bottom dead center for the first time after the exhaust stroke is finished and when the piston reaches a top dead center, and the first period including at least a third period between when the piston starts to rise after passing through the bottom dead center for the first time after the exhaust stroke is finished and when the intake valve is closed, and wherein the fuel from the fuel injection valve is blown to a gas that flows backward from an inside of a cylinder to an inside of the intake pipe and is blown to the fuel injection valve.

2. The engine control device according to claim 1, wherein the engine is provided with a second fuel injection valve that directly injects a fuel into the cylinder, and wherein the second fuel injection valve is caused to inject the fuel during the second period between when the intake valve is closed after the piston passes through the bottom dead center for the first time after the exhaust stroke is finished and when the piston reaches the top dead center.

* * * * *